United States Patent
Trzcinski et al.

(10) Patent No.: US 8,903,516 B2
(45) Date of Patent: Dec. 2, 2014

(54) VISUAL ALIGNMENT SYSTEM AND METHOD FOR WORKPIECE MARKING

(75) Inventors: Frank J. Trzcinski, Ellington, CT (US); Kathryn M. Schwink, Rocky Hill, CT (US)

(73) Assignee: United Technologies Corporation, Hartford, CT (US)

(*) Notice: Subject to any disclaimer, the term of this patent is extended or adjusted under 35 U.S.C. 154(b) by 333 days.

(21) Appl. No.: 13/602,599

(22) Filed: Sep. 4, 2012

(65) Prior Publication Data

US 2014/0061173 A1 Mar. 6, 2014

(51) Int. Cl.
| | |
|---|---|
| *G05B 19/18* | (2006.01) |
| *G06F 19/00* | (2011.01) |
| *G05B 15/00* | (2006.01) |
| *B23K 26/00* | (2014.01) |
| *G06K 9/00* | (2006.01) |
| *G06K 9/20* | (2006.01) |
| *G06K 9/36* | (2006.01) |

(52) U.S. Cl.
USPC ............... 700/59; 700/60; 700/166; 700/259; 219/121.69; 382/103; 382/151; 382/152; 382/287; 382/291

(58) Field of Classification Search
CPC .................. B23K 2201/007; H01L 21/67282; H01L 21/681; G06T 2207/30204; B41M 5/262; B44C 1/228
USPC ..................... 700/56–60, 166, 245, 258, 259; 219/121.6, 121.67, 121.68, 121.69; 702/150; 382/103, 106, 107, 141, 145, 382/151–153, 286, 287, 291
See application file for complete search history.

(56) References Cited

U.S. PATENT DOCUMENTS

| | | | |
|---|---|---|---|
| 4,406,567 | A | 9/1983 | Samis |
| 5,615,489 | A | 4/1997 | Breyer et al. |
| 5,893,668 | A | 4/1999 | Harrison et al. |
| 6,211,484 | B1 * | 4/2001 | Kaplan et al. ............ 219/121.68 |
| 6,292,584 | B1 | 9/2001 | Dulaney et al. |
| 6,322,497 | B1 * | 11/2001 | Takahashi ..................... 600/118 |
| 6,476,351 | B1 * | 11/2002 | Kaplan et al. ............ 219/121.69 |
| 6,528,763 | B1 | 3/2003 | Lahram et al. |
| 6,671,039 | B2 | 12/2003 | Yoda et al. |
| 6,683,976 | B2 | 1/2004 | Dulaney et al. |
| 6,822,192 | B1 | 11/2004 | Young |

(Continued)

FOREIGN PATENT DOCUMENTS

| | | | |
|---|---|---|---|
| JP | 07-204994 A | | 8/1995 |
| JP | 2006351796 A | * | 12/2006 |
| JP | 2008018473 A | * | 1/2008 |
| KR | 20080089165 A | | 10/2008 |

OTHER PUBLICATIONS

International Search Report and Written Opinion from PCT Application No. PCT/US2013/056235; Dated Jan. 16, 2014; 11 pages.

*Primary Examiner* — Crystal J Barnes-Bullock

(74) *Attorney, Agent, or Firm* — Kinney & Lange, P.A.

(57) ABSTRACT

An alignment system for permanently marking a workpiece with a marking device includes a camera, a display operatively connected to the camera and configured to generate an image as a function of camera input, a template having a marking area designation located in relation to the display such that the image is displayed against the marking area designation, and an adjustment table configured to allow controllable repositioning of the workpiece relative to the marking device.

19 Claims, 4 Drawing Sheets

(56) References Cited

U.S. PATENT DOCUMENTS

| | | |
|---|---|---|
| 6,867,390 B2 | 3/2005 | Clauer et al. |
| 7,015,418 B2 * | 3/2006 | Cahill et al. ............ 219/121.69 |
| 7,067,763 B2 * | 6/2006 | Schramm ................ 219/121.69 |
| 7,119,351 B2 * | 10/2006 | Woelki ...................... 250/559.4 |
| 7,137,282 B2 | 11/2006 | Westley et al. |
| 7,305,620 B1 * | 12/2007 | Nakajima et al. ............. 358/1.1 |
| 7,529,409 B2 | 5/2009 | Long |
| 7,569,840 B2 * | 8/2009 | Morikazu et al. .......... 250/491.1 |
| 7,750,266 B2 | 7/2010 | Dane et al. |
| RE41,924 E * | 11/2010 | Nemets et al. ............. 250/559.4 |
| 7,889,930 B2 | 2/2011 | Long |
| 7,966,856 B1 | 6/2011 | Razi et al. |
| 8,011,583 B2 | 9/2011 | Lei et al. |
| 8,087,180 B1 * | 1/2012 | Clayton .......................... 33/613 |
| 8,374,420 B2 * | 2/2013 | Murakami .................... 382/153 |
| 2003/0033047 A1 | 2/2003 | Rapoza et al. |
| 2004/0089642 A1 | 5/2004 | Christensen et al. |
| 2007/0186417 A1 | 8/2007 | Smyth |
| 2011/0182499 A1 | 7/2011 | Feldmann et al. |
| 2011/0206269 A1 | 8/2011 | Tyler et al. |
| 2011/0297749 A1 | 12/2011 | Lezhnev et al. |
| 2012/0074107 A1 | 3/2012 | Berthe et al. |

* cited by examiner

VISUAL ALIGNMENT SYSTEM AND METHOD FOR WORKPIECE MARKING

BACKGROUND

The present invention relates generally to systems and methods for marking workpieces.

Workpieces, such as airfoils for gas turbine engines, are frequently marked with desired indicia. For example, airfoils can include a root or shank portion that is marked with a part number, serial number, coating information, or other information. Such markings can be in the form of alphanumeric characters, or in some instances, coding systems (e.g., bar codes, dot matrix codes and the like). The markings can be made with a process such as dot peening or etching that physically and permanently places the mark(s) on the workpiece, as opposed to a process that merely places markings on the workpiece with ink, adhesive or other less permanent methods.

Workpiece marking requires proper alignment of a marking tool relative to the workpiece. The marking tool is typically in a fixed or pre-set position. However, the marking tool, a workpiece or workpiece fixture may inadvertently move, causing misalignment. Improper tool alignment can lead to relatively high amounts of scrap or rework. For instance, a dot peening tool that is improperly aligned with a workpiece can placing a marking in a location that crosses a break edge of the workpiece can necessitate scrapping the workpiece. Existing manual dot peening tools do not provide a mechanism for precise workpiece alignment over time and many repetitions of marking operations.

Accordingly, a new system and method for workpiece marking and marking alignment is desired.

SUMMARY

An alignment system for permanently marking a workpiece with a marking device includes a camera, a display operatively connected to the camera and configured to generate an image as a function of camera input, a template having a marking area designation located in relation to the display such that the image is displayed against the marking area designation, and an adjustment table configured to allow controllable repositioning of the workpiece relative to the marking device.

Figure 1A:
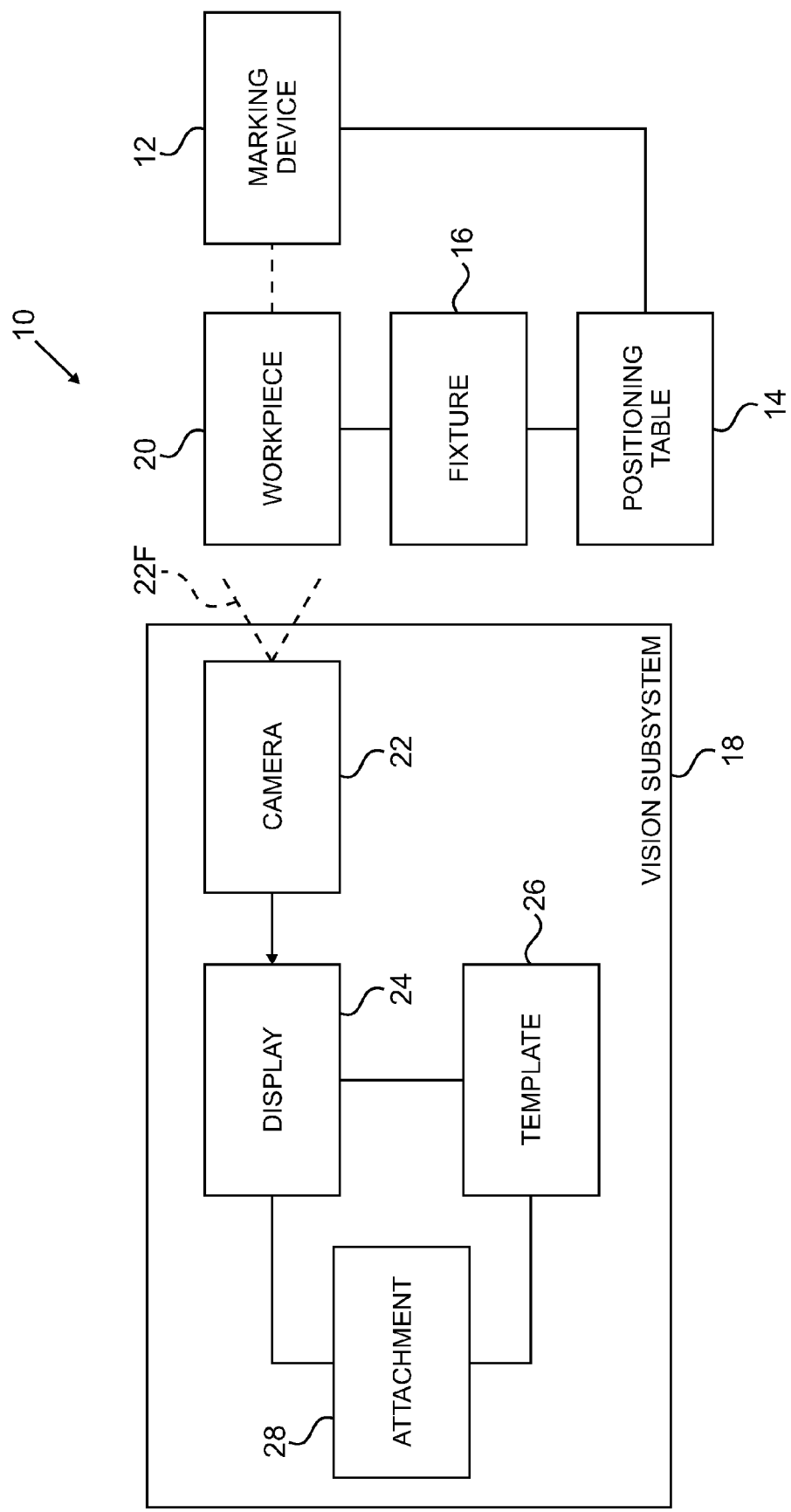
FIG. 1A is a schematic block diagram of one embodiment of a workpiece marking system according to the present invention.

While the above-identified drawing figures set forth at least one embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1A is a schematic block diagram of one embodiment of a workpiece marking system 10 (see also FIG. 2), which can include a marking device 12, a positioning table 14, a fixture 16, and a vision subsystem 18. With the system 10, operators can visually verify that marking by the marking device 12 will occur in a desired location before physically marking a given workpiece 20. Details of the system 10 and its operation are explained below, and illustrated in the accompanying figures. However, it should be noted the disclosed embodiments are provided merely by way of example and not limitation.

The marking device 12 can be a dot peen marking machine, such as a bench-mounted dot peen machine available from Marks Pryor Marking Technology Pvt. Ltd., India. In alternate embodiments, the marking device can be of another type capable of producing permanent markings, such as a machine for etching, scribing, press marking, laser marking or the like. The marking device 12 can mark with alphanumeric characters, codes (e.g., bar codes or dot matrix codes), or other desired indicia. The particular form and content of the markings can vary as desired for particular applications, and will depend on characteristics of a workpiece 20 desired to marked. For example, if the workpiece 20 is an airfoil for a gas turbine engine, information such as a part number, serial number, coating information, and/or other information can be marked on a root or shank portion of the airfoil with arrays of dots permanently marked on a surface to provide desired indicia. Marking indicia can also be used to overwrite, obscure, X-out, or modify previous markings already on the workpiece 20.

The positioning table 14 can be mounted in a fixed relationship relative to the marking device 12, and can allow two or more degrees of freedom for controlled adjustment of an associated workpiece platter. It should be understood that the word "table" as used herein can refer to a supporting structure, where having a planar or flat top surface or not. In one embodiment, the positioning table 14 is a bench-mountable, manually adjustable X-Y machine shop table. Adjustment to the positioning table 14 can be made manually by an operator by way of rotatable adjustment knobs, with one knob for each direction, or another suitable mechanism. In further embodiments, a positioning table with a powered adjustment mechanism could be used.

The fixture 16 has a suitable configuration to retain the workpiece 20. The fixture 16 can be secured to the positioning table 14, such that the fixture and the workpiece 20 can both be repositioned relative to the marking device 12 through adjustment of the positioning table 14 (e.g., adjustment of the adjustable workpiece platter of the positioning table 14). The fixture 16 further presents the workpiece 20 to the marking device 12 in a desired orientation. That is, the fixture 16 exposes a portion of the workpiece 20 to the marking device 12. Those of ordinary skill in the art will appreciate that the configuration of the fixture 16 will vary depending on the configuration of the workpiece 20 and the desired marking location on the workpiece 20.

The vision subsystem 18 can be positioned adjacent to the marking device 12, the positioning table 14, the fixture 16 and the workpiece 20, such that the workpiece 20 is in view of the vision subsystem 18. In the embodiment illustrated in FIG.

1A, the vision subsystem 18 includes a camera 22, a display 24, a template 26, and an attachment 28.

The camera 22 can be a digital camera, charge coupled device (CCD), analog camera, or any other suitable imaging device. The camera 22 can be fixedly secured to the marking device 12, such that a field of view 22F of the camera 22 can be fixed relative to the marking device 12. In one embodiment, the field of view 22F of the camera 22 is fixedly focused on a given position of the marking machine 12, that is, at a (X,Y) Cartesian coordinate of the marking machine 12, where the marking machine 12 is configured to begin a marking operation on a given workpiece. The field of view 22F of the camera 22 can further encompass an entire area necessary or desired for marking the workpiece 20. The camera 22 can include suitable processing capabilities to control camera operations, such as zoom, focus, and the like. Camera processing capabilities can optionally be provided by a computer or other suitable controller that is separate from and connected to sensor or lens assembly of the camera 22, or such processing capabilities can be provided by a controller integrated into the camera 22 in a single discrete unit. For simplicity, all components of the camera 22, including processing capabilities, are illustrated as a single box in FIG. 1A. During operation, the zoom, focus and other settings of the camera 22 can be established during initial set-up and then held at fixed settings during later use. Camera settings need not be (and preferably should not be) altered for each marking operation, subsequent to initial set-up of the system 10.

The display 24 (or display device) is connected to the camera 22, and can provide a visual representation of a video feed (or at least one or more images) from the camera 22. The display 24 can be any suitable device, such as a flat-screen monitor (e.g., liquid crystal display, light emitting diode display, digital laser project display, plasma display, or the like), a cathode ray tube (CRT) monitor, or the like. As noted above, the field of view 22F of the camera 22 can be fixedly focused on a given position of the marking machine 12 where marking beings, and can further encompass the entire area necessary or desired for marking the workpiece 20. Additional surrounding areas encompassed by the field of view 22F can also be represented on the display 24. In this way, the display 24 can provide a visual representation of an area of the workpiece 20 that will be marked by the marking device 12, prior to initiation of a marking procedure with the marking device 12. An operator can therefore view the area to be marked on the workpiece 20 on the display 24 prior to initiating a given marking operation.

In the embodiment illustrated in FIG. 1A, the vision subsystem 18 includes the template 26 and the attachment 28. The template 26 can be a physical object positioned relative to the display 24, and held in place by the attachment 28. The template 26 can be at least temporarily fixedly positioned adjacent to the display 24 during set-up of the system 10, and can be left in a pre-set position relative to an image generated by the display 24 for marking workpieces for which the template 26 is associated. An assortment of different templates 26 can optionally be provided for different types of marking operations, with each version of the template 26 corresponding to a particular workpiece and marking operation combination. The template 26 can be an at least partially transparent or translucent sheet with suitable markings to designate one or more marking regions, as will be explained further below.

The attachment 28 can take a variant of forms. For example, the attachment 28 can include slots, tabs, clips, springs, sleeves, ties, adhesive (e.g., pressure sensitive adhesive), glue, tape and/or other attachment mechanisms that can retain the template 26 relative to the display 24. The attachment can be configured to allow selective removal of the template 26, such as to replace one version of the template 26 with another version of the template 26 in order to mark a different type of workpiece or to provide different markings. Moreover, the attachment 28 can provide for selective adjustment of the template 26 relative to the display 24, in order to permit operator adjustment of relative alignment.

Figure 1B:
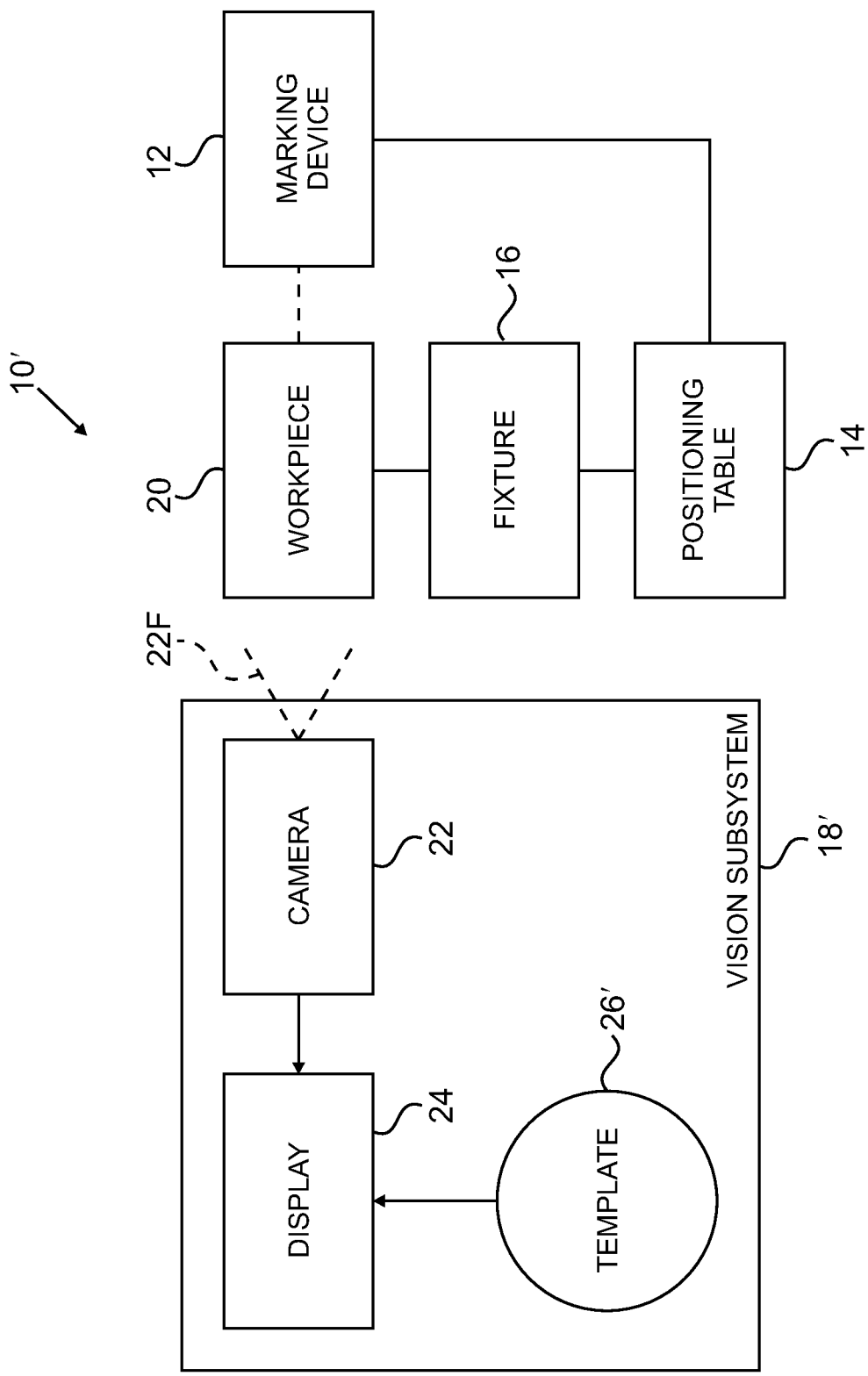
FIG. 1B is a schematic block diagram of another embodiment of a workpiece marking system according to the present invention.

FIG. 1B is a schematic block diagram of another embodiment of a workpiece marking system 10'. The system 10' is generally similar to the system 10, except that a vision subsystem 18' of the system 10' differs from the vision subsystem 18 of the system 10. The vision subsystem 18' includes a template 26' that is provided as an electronic input to the display 24. The template 26' can be presented as a graphical representation that is superimposed over or co-generated with a representation of the field of view 22F of the camera 22 on the display 24. In addition, or in the alternative, the electronic input of the template 26' can act as a filter that filters out or blocks (partially or fully) one or more portions of the image of the display 24, such that only designated marking area is fully visible. In one embodiment, the template 26' can be provided via processing capabilities of the camera 22. Positioning of the template 26' on the display 24 can be adjusted by an operator during set-up.

Figure 2:
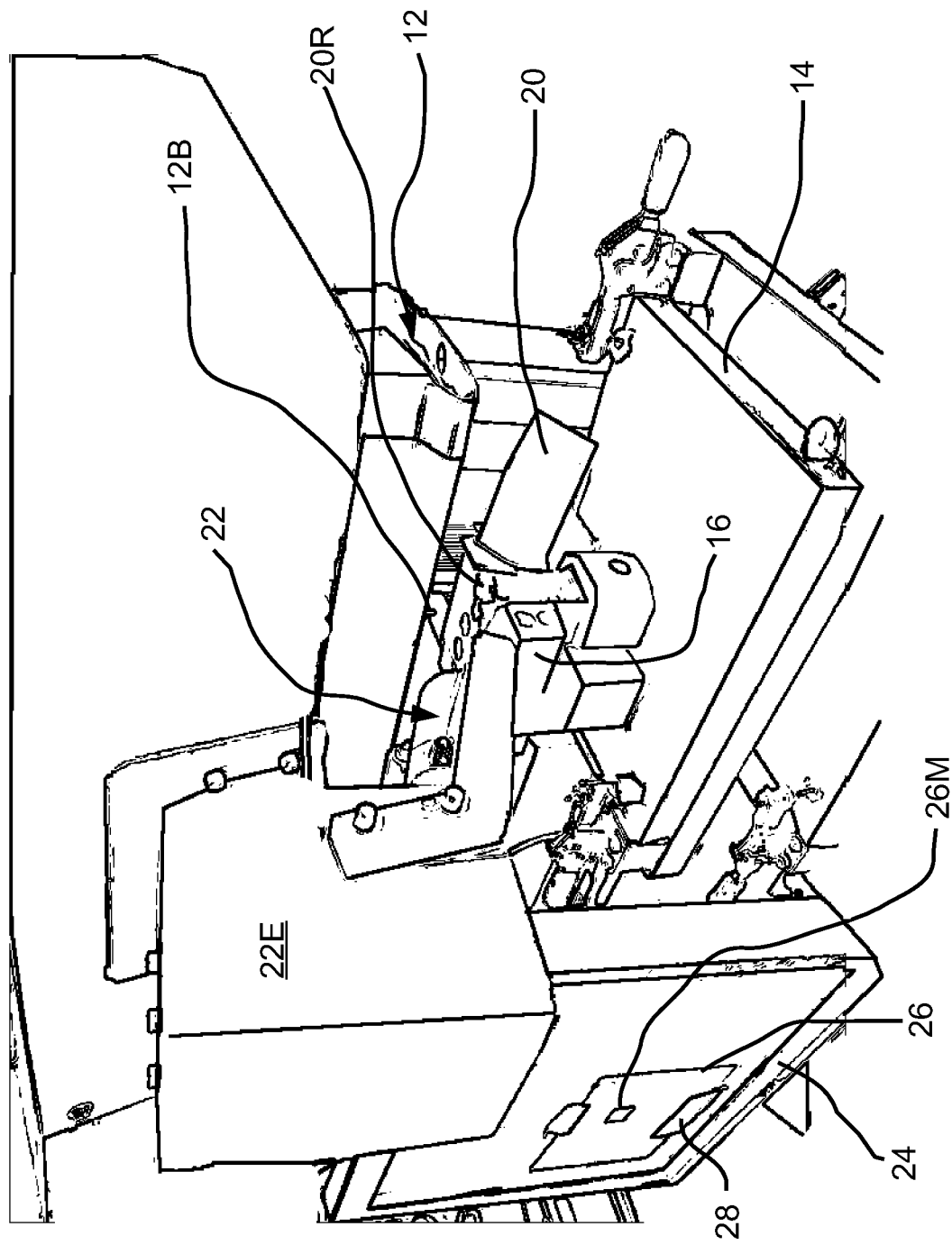
FIG. 2 is a perspective view of the embodiment of the workpiece marking system of FIG. 1A.

FIG. 2 is a perspective view of the embodiment of the workpiece marking system 10. The components of the system 10 are as described above. However, FIG. 2 further illustrated an optional enclosure 22E that can be attached to a hood of the marking device 12 and positioned about the camera 22. The enclosure 22E can help protect the camera 22 from contact that may tend to reposition or misalign the camera 22. Furthermore, as shown in the embodiment of FIG. 2, the workpiece 20 is a gas turbine engine airfoil in which marking are intended to be placed on an axial face of a fir tree shaped airfoil root 20R, with the root 20R retained in a corresponding slot in the fixture 16. It should also be noted that in FIG. 2 the camera 22 is spaced from the workpiece 20 and the fixture 16, such that operators handling the workpiece 20 and/or the fixture 16 can remain at a distance from the camera 22.

A set-up procedure can be conducted using a test workpiece, that is, a workpiece 20 that is understood to be intended for eventual scrap. The test workpiece is placed in the fixture 16 and roughly aligned with a marking bit 12B of the marking device 12. A test run is performed to place marking on the test workpiece with the bit 12B of the marking device 12. The field of view 22F of the camera 22 is then aligned in relation to the location where the marking device 12 created markings on the test workpiece, such that the entire area in which markings were place (and any other desired areas) is visible in an image produced on the display 24. The template 26 (or 26') can then be positioned relative to the image on the display 24 such that a designation on the template 26 (or 26') encompasses an area in which the markings were placed on the test workpiece by the marking device 12. The test workpiece can then be discarded, and a workpiece 20 desired to be marked can be placed in the fixture 16 without a need for adjustment of the camera 22, the template 26 (or 26') or the display 24.

Figure 3:
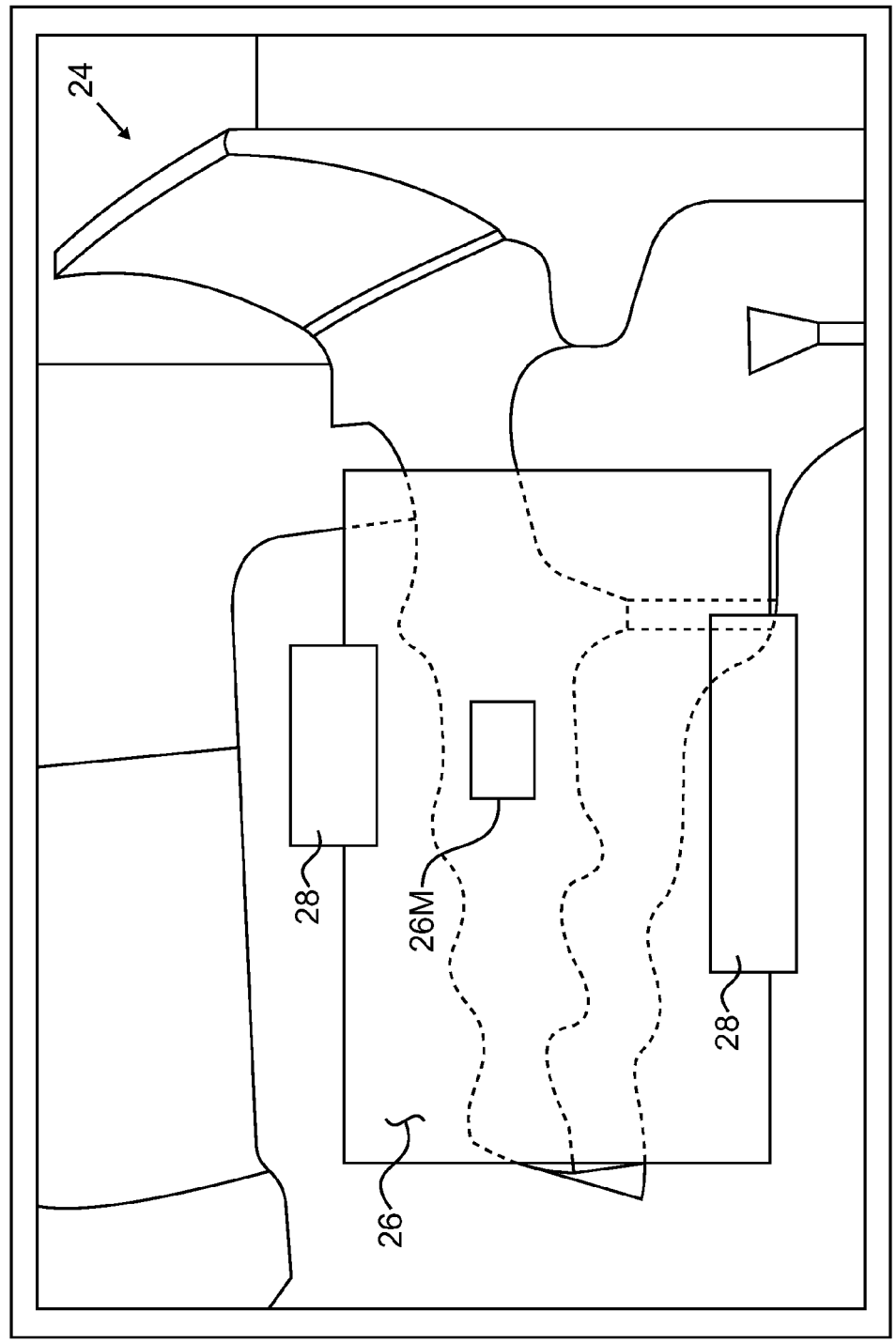
FIG. 3 is a front view of a portion of the embodiment of the workpiece marking system of FIGS. 1A and 2.

FIG. 3 is a front view of a portion of the embodiment of the workpiece marking system 10. As shown in FIG. 3, the display 24 provides a representation of the workpiece 20 captured by the field of view 22F of the camera 22 (it should be noted that FIG. 3 does not depict the workpiece itself, but rather an image of the workpiece 20 generated on the display 24). The template 26 is secured to the display 24 with the attachment 28. In the illustrated embodiment, the attachment 28 is provided as multiple pieces of adhesive tape. The template 26 provides a designation of a marking area 26M, which during set-up of the system 10 is calibrated to represent the area in which the marking device 12 will place markings. The image captured by the camera 22 appears on the display 24 against the designation of a marking area 26M. The operator can adjust the positioning table 14 to align the workpiece 20 (and the associated fixture 16) relative to the marking device 12 such that in the image on the display 24 the region of the workpiece 20 desired to be marked appears within (e.g., entirely within) the designation of the marking area 26M of the template 26. This allows the operator to compensate for any incidental misalignment of the workpiece 20 (or the fixture 16) relative to the marking device 12. The operator can align the workpiece 20 such that the desired marking location on the workpiece 20 is aligned with markings of the template 26 or 26', in order to help ensure that the marking device 12 places the markings in the desired location with the marking tool bit 12B. In some embodiment, this process can involve ensuring that no break edges, discontinuities, protrusions or other such features of the workpiece 20 presented on the display 24 appear within the designation of the marking area 26M of the template 26. That is, the designation of the marking area 26M of the template 26 can be aligned with a relative flat, central region of a surface of the workpiece 20. Those of ordinary skill in the art will appreciate that the particular area desired to be marked, and regions acceptable for marking will vary as desired for particular applications. The same alignment process applies to the embodiment of the system 10'.

Those of ordinary skill in the art will appreciate that the present disclosure provides numerous advantages and benefits. For example, the present disclosure can help reduce workpiece scrap and/or rework by promoting marking tool alignment. Calibration is not required for each individual marking operation on a workpiece 20. Bumping and other events that tend to move the fixture 16 or the workpiece 20 out of alignment are more likely than events that move the camera 22 out of alignment, because operators are routinely engaging and disengaging workpieces 20 with the fixture 16 over time yet have no need to be in close proximity to the camera 22 with the system 10 (or 10'). Moreover, the present system provides an elegant and simple solution to misalignment problems without requiring, for instance, complex and expensive robotic equipment. Other features and benefits of the present disclosure will be appreciated by those of ordinary skill in the art in view of the entirety of the present disclosure.

Discussion of Other Possible Embodiments

The following are non-exclusive descriptions of possible embodiments of the present invention.

An alignment system for permanently marking a workpiece with a marking device can include a camera; a display operatively connected to the camera and configured to generate an image as a function of camera input; a template having a marking area designation located in relation to the display such that the image is displayed against the marking area designation; and an adjustment table configured to allow controllable repositioning of the workpiece relative to the marking device.

The system of the preceding paragraph can optionally include, additionally and/or alternatively, any one or more of the following features, configurations and/or additional components:

the adjustment table can comprise a manually adjustable X-Y table;

the camera can have a field of view that is fixed in relation to the marking device;

the camera can be spaced from the workpiece;

the template can comprise an at least partially transparent or translucent sheet physically secured adjacent to the display with an attachment;

the template can comprise an electronic input to the display;

the marking area designation of the template can be aligned with a portion of the image generated by the display in which markings are produced by the marking device;

a fixture to retain the workpiece relative to the marking device; and/or the marking device can comprise a dot peening machine.

A method for aligning a workpiece with a marking device configured to permanently mark the workpiece can include capturing an image of a workpiece with a camera; displaying the image of the workpiece on a display device; locating a template with a marking area designation against the displayed image such that the image is displayed against the marking area designation; selectively adjusting a position of the workpiece relative to the marking device so that a desired marking location on the workpiece is displayed within the marking area designation of the template; and placing markings on the positioned workpiece.

The method of the preceding paragraph can optionally include, additionally and/or alternatively, any one or more of the following features and/or additional steps:

engaging the workpiece in a fixture that is secured relative to the marking device;

engaging a test workpiece with a fixture secured relative to the marking device; marking the test workpiece with the marking device; capturing an image of the test workpiece with the camera; displaying the image of the test workpiece on the display device; and adjusting a position of the template relative to the image of the test workpiece such that the marking area designation aligns with the markings on the test workpiece;

discarding the test workpiece; and engaging the workpiece with the fixture;

the step of selectively adjusting a position of the workpiece relative to the marking device so that a desired marking location on the workpiece is displayed within the marking area designation of the template can comprise manually adjusting an X-Y table;

a field of view of the camera can be held fixed in relation to the marking device;

the step of locating a template with a marking area designation against the displayed image such that the image is displayed against the marking area designation can comprise providing the template in the form of an electronic input to the display; and/or the step of placing markings on the positioned workpiece can comprise placing dot peening marks on the work piece.

A method for use with a marking device can include engaging a test workpiece with a fixture secured relative to the marking device; marking the test workpiece with the marking device; capturing an image of the test workpiece with a camera; displaying the image of the test workpiece on a display device; locating a template with a marking area designation against the displayed image such that the image is displayed against the marking area designation; and adjusting a position of the template relative to the image of the test workpiece such that the marking area designation aligns with the markings on the test workpiece.

The method of the preceding paragraph can optionally include, additionally and/or alternatively, any one or more of the following features and/or additional steps:

discarding the test workpiece; engaging a production workpiece with the fixture; capturing an image of the production workpiece with the camera, wherein a field of view of the camera is held fixed in relation to the marking device subsequent to the step of adjusting a position of the template relative to the image of the test workpiece such that the marking area designation aligns with the markings on the test workpiece; displaying the image of the production workpiece on the display device; selectively adjusting a position of the production workpiece relative to the marking device so that a desired marking location on the production workpiece is displayed within the marking area designation of the template; and placing markings on the positioned production workpiece.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment system for permanently marking a workpiece with a marking device, the system comprising:
    a camera;
    a display operatively connected to the camera and configured to generate an image as a function of camera input;
    a template having a marking area designation located in relation to the display such that the image is displayed against the marking area designation; and
    an adjustment table configured to allow controllable repositioning of the workpiece relative to the marking device.

2. The system of claim 1, wherein the adjustment table comprises a manually adjustable X-Y table.

3. The system of claim 1, wherein the camera has a field of view that is fixed in relation to the marking device.

4. The system of claim 1, wherein the camera is spaced from the workpiece.

5. The system of claim 1, wherein the template comprises an at least partially transparent or translucent sheet physically secured adjacent to the display with an attachment.

6. The system of claim 1, wherein the template comprises an electronic input to the display.

7. The system of claim 1, wherein the marking area designation of the template is aligned with a portion of the image generated by the display in which markings are produced by the marking device.

8. The system of claim 1, and further comprising:
    a fixture to retain the workpiece relative to the marking device.

9. The system of claim 1, wherein the marking device comprises a dot peening machine.

10. A method for aligning a workpiece with a marking device configured to permanently mark the workpiece, the method comprising:
    capturing an image of a workpiece with a camera;
    displaying the image of the workpiece on a display device;
    locating a template with a marking area designation against the displayed image such that the image is displayed against the marking area designation;
    selectively adjusting a position of the workpiece relative to the marking device so that a desired marking location on the workpiece is displayed within the marking area designation of the template; and
    placing markings on the positioned workpiece.

11. The method of claim 10 and further comprising:
    engaging the workpiece in a fixture that is secured relative to the marking device.

12. The method of claim 10 and further comprising:
    engaging a test workpiece with a fixture secured relative to the marking device;
    marking the test workpiece with the marking device;
    capturing an image of the test workpiece with the camera;
    displaying the image of the test workpiece on the display device; and
    adjusting a position of the template relative to the image of the test workpiece such that the marking area designation aligns with the markings on the test workpiece.

13. The method of claim 11 and further comprising:
    discarding the test workpiece; and
    engaging the workpiece with the fixture.

14. The method of claim 10, wherein the step of selectively adjusting a position of the workpiece relative to the marking device so that a desired marking location on the workpiece is displayed within the marking area designation of the template comprises manually adjusting an X-Y table.

15. The method of claim 10, wherein a field of view of the camera is held fixed in relation to the marking device.

16. The method of claim 10, wherein the step of locating a template with a marking area designation against the displayed image such that the image is displayed against the marking area designation comprises providing the template in the form of an electronic input to the display.

17. The method of claim 10, wherein the step of placing markings on the positioned workpiece comprises placing dot peening marks on the work piece.

18. A method for use with a marking device, the method comprising:
    engaging a test workpiece with a fixture secured relative to the marking device;
    marking the test workpiece with the marking device;
    capturing an image of the test workpiece with a camera;
    displaying the image of the test workpiece on a display device;
    locating a template with a marking area designation against the displayed image such that the image is displayed against the marking area designation; and
    adjusting a position of the template relative to the image of the test workpiece such that the marking area designation aligns with the markings on the test workpiece.

19. The method of claim 17 and further comprising:
    discarding the test workpiece;
    engaging a production workpiece with the fixture;
    capturing an image of the production workpiece with the camera, wherein a field of view of the camera is held fixed in relation to the marking device subsequent to the step of adjusting a position of the template relative to the image of the test workpiece such that the marking area designation aligns with the markings on the test workpiece;

displaying the image of the production workpiece on the display device;

selectively adjusting a position of the production workpiece relative to the marking device so that a desired marking location on the production workpiece is displayed within the marking area designation of the template; and placing markings on the positioned production workpiece.

* * * * *